United States Patent [19]
Nelson et al.

[11] Patent Number: 5,648,032
[45] Date of Patent: Jul. 15, 1997

[54] PROCESS FOR PRODUCING POLYESTER ARTICLES HAVING LOW ACETALDEHYDE CONTENT

[75] Inventors: Gregory Wayne Nelson; Vincent Alvin Nicely, both of Kingsport, Tenn.

[73] Assignee: Eastman Chemical Company, Kingsport, Tenn.

[21] Appl. No.: 509,845

[22] Filed: Aug. 1, 1995

[51] Int. Cl.[6] ............................ B29C 47/76; B29C 47/92
[52] U.S. Cl. ........................ 264/101; 159/2.2; 264/141; 264/211.23; 264/331.21; 425/203; 528/308.5
[58] Field of Search ........................ 264/101, 141, 264/331.21, 211.23, 211.24, 85; 528/308.5, 308.3, 308.8; 425/203; 159/2.2

[56] References Cited

U.S. PATENT DOCUMENTS

| | | |
|---|---|---|
| 3,044,993 | 7/1962 | Gerke et al. . |
| 3,161,710 | 12/1964 | Turner et al. . |
| 3,279,895 | 10/1966 | Howe . |
| 3,486,864 | 12/1969 | vanderSchee et al. . |
| 3,526,484 | 9/1970 | Kilpatrick . |
| 3,619,145 | 11/1971 | Crawford et al. . |
| 3,678,983 | 7/1972 | Widmer et al. . |
| 3,913,796 | 10/1975 | Aoki . |
| 4,060,226 | 11/1977 | Schweller . |
| 4,064,112 | 12/1977 | Rothe et al. . |
| 4,107,787 | 8/1978 | Ocker . |
| 4,142,040 | 2/1979 | Jabarin et al. . |
| 4,226,973 | 10/1980 | Malo et al. ........................ 528/481 |
| 4,230,819 | 10/1980 | Hauenstein et al. . |
| 4,255,295 | 3/1981 | Regnault et al. . |
| 4,263,425 | 4/1981 | Rothe et al. . |
| 4,340,721 | 7/1982 | Bonnebat et al. ........................ 528/272 |
| 4,362,852 | 12/1982 | Pendlebury et al. . |
| 4,430,721 | 2/1984 | Acampora . |
| 4,591,629 | 5/1986 | El-Ghatta . |
| 4,609,721 | 9/1986 | Kirshenbaum et al. ........................ 528/285 |
| 4,836,767 | 6/1989 | Schad et al. . |
| 4,963,644 | 10/1990 | Duh . |
| 4,980,105 | 12/1990 | Schmidt et al. . |
| 5,090,134 | 2/1992 | Rüssemeyer et al. . |
| 5,102,594 | 4/1992 | Burlet et al. . |
| 5,119,170 | 6/1992 | Iwamatsu . |
| 5,119,570 | 6/1992 | Russemeyer et al. ........................ 34/10 |
| 5,176,861 | 1/1993 | Ishikawa ........................ 264/101 |
| 5,187,216 | 2/1993 | Cassell et al. ........................ 524/261 |
| 5,266,413 | 11/1993 | Mills et al. ........................ 264/523 |
| 5,362,844 | 11/1994 | Kerpes et al. ........................ 264/5 |
| 5,459,168 | 10/1995 | Nasr et al. ........................ 521/49.8 |

FOREIGN PATENT DOCUMENTS

| | | |
|---|---|---|
| 53-71162 | 6/1978 | Japan . |
| 55-069618 | 5/1980 | Japan . |

*Primary Examiner*—Jeffery R. Thurlow
*Attorney, Agent, or Firm*—Karen A. Harding; Harry J. Gwinnell

[57] ABSTRACT

Disclosed is a process for producing molded polyester articles having a low acetaldehyde content by a) reacting a glycol and a dicarboxylic acid in the melt phase to form a polyester having an I.V. of about 0.65–0.85, b) solidifying and pelletizing said polyester, c) remelting said polyester in an extruder, and, d) forming said polyester into shaped articles, wherein the polyester is devolatilized during or following said polymerization in the melt, while it is being remelted, after remelting, or any combination by passing a purge gas over said molten polyester.

11 Claims, 2 Drawing Sheets

PROCESS FOR PRODUCING POLYESTER ARTICLES HAVING LOW ACETALDEHYDE CONTENT

TECHNICAL FIELD

The present invention relates to a process for producing polyester articles having low acetaldehyde content wherein the conventional solid state polycondensation step is not required. The steps of the present invention include polymerization in the melt, pelletizing, optionally crystallizing, remelting, and forming into useful articles, wherein the polyester is devolatilized during or following polymerization in the melt, or during remelting.

BACKGROUND OF THE INVENTION

Polyesters are widely used in the manufacture of fibers, molded objects, films, sheeting, food trays, as well as food and beverage containers. These polymers are generally made by batch or continuous melt phase polycondensation reactions well known in the art. The polymers are then pelletized and used in various extrusion or molding operations. In certain applications where higher molecular weight polymers are required, the pellets are subjected to "solid state" polycondensation conditions in which the inherent viscosity (I.V.) value is significantly increased. Such solid state polycondensation reactions are used for two reasons. First, because the melt viscosity of polyester polymers is quite high for polymers having I.V. values greater than about 0.6, solid stating provides a convenient means to handle the polymer. Secondly, the solid stating process provides conditions conducive to removing unwanted volatile impurities such as acetaldehyde which is important in some applications as discussed below. Also, polyesters are well known to be degraded by small amounts of moisture when they are melt processed in conventional equipment. Consequently, polyesters are usually carefully dried to very low moisture levels in a drier prior to melt processing. The drying process may remove some objectional volatile materials other than water also.

During the preparation and processing of polyesters such as poly(ethylene terephthalate)(PET) in the melt phase, certain byproducts are formed. One such byproduct is acetaldehyde, and its presence in molded objects such as food containers, beverage bottles, water bottles, and the like is quite deleterious from a taste standpoint. Particularly for sensitive beverages such as cola, beer, and water, it is highly desirable to produce preforms having less than about 10 ppm of acetaldehyde. Achieving this low level of acetaldehyde is difficult, however, because, as is well known to practitioners of the art, acetaldehyde is continually formed as a byproduct during the polymerization and subsequent melt processing of PET and similar polymers.

Before the discovery of the present invention, therefore, a four-stage process has been universally used to provide polyester polymers suitable for uses in which it is important to minimize the presence of acetaldehyde. Such a process typically involves the preparation of a relatively low molecular weight precursor polymer, having an I.V. value of about 0.3–0.6, by melt-phase polymerization techniques that are well known in the art. The acetaldehyde content of such a precursor may range from about 30 ppm to over 150 ppm, depending on the reaction conditions chosen. This precursor is then cooled, shaped into pellets, crystallized, and subjected to further solid-state polymerization at a lower temperature. Typically, a gas is used to strip glycols, acetaldehyde, and other reaction byproducts from the pellets so that at the end of the solid-state process, the I.V. value has been increased to about 0.75 or more, and the acetaldehyde content has been reduced to below about 1 ppm or less. After solid stating, polyesters are commonly handled in contact with ambient air from which it absorbs moisture. Thus, as a third step, the polymer is usually dried immediately prior to the fourth step in which it is heated and melted in order to be formed into a useful shape, such as a beverage bottle preform. The processing typically causes a small decrease in the I.V. of the polymer and an increase in acetaldehyde content of from less than 1 ppm in the pellets, to up to about 8 or 10 ppm or more in the shaped article. This dramatic increase in acetaldehyde occurs despite the fact that the molding process takes typically less than one or two minutes to complete.

We have now discovered a process whereby polyesters such as PET and similar polymers may be prepared and used without need for the solid stating process nor the usual drying of solid pellets. The polymer is prepared and used by a combination of the following operations: melt polymerization, pelletizing, optionally crystallizing, remelting, and forming into useful articles, wherein the polyester is devolatilized during or following polymerization in the melt, while being remelted, after remelting, or any combination thereof. A preferred combination of operations would be to prepare the polymer in the melt to the desired I.V., pelletize the polymer, store and/or transport the amorphous polymer pellets, melt the polymer in a machine designed to dry the polymer while melting it or shortly after melting therein preserving the I.V. of the polymer, devolatilize the melt of acetaldehyde, and forming the purified polymer melt into useful shaped articles, such as for example beverage bottle preforms, wherein the shaped articles having surprisingly low acetaldehyde content. Not only does the process of the present invention avoid the costly additional steps of the conventional process of drying, crystallizing, and solid-state polymerization, but the shaped articles produced by our process possess in addition to low acetaldehyde content, other superior properties such as for example better color, less loss of molecular weight due to breakdown, and freedom from defects known as "bubbles" and "unmelts" which are sometimes formed during the conventional molding process. These and other advantages of the present invention will become apparent in the description which follows.

We are not aware of any prior art which describes the full process of this invention. The following documents may be of interest with respect to certain aspects of the invention.

U.S. Pat. No. 4,340,721 describes PET copolyesters containing 1.5–7.5 mol % of modifying dibasic acids or glycols which have an acetaldehyde content of less than 1.25 ppm.

Japan Patent Application 53-71162 (1978) describes remelting polyester chips and holding the molten polymer under vacuum to reduce the concentration of acetaldehyde.

U.S. Pat. No. 4,263,425 describes the solid stating of PET pellets to provide polymer having a low concentration of acetaldehyde. This reference also states: "Acetaldehyde can partially be eliminated if a stirred melt is treated at higher temperatures under vacuum. By this method, the tolerable minimum limits (of acetaldehyde) are not reached . . . ".

U.S. Pat. No. 4,064,112 describes a method for overcoming sticking problems during the solid stating process. It discusses the disadvantages of a solely melt phase process and states that "elevated concentrations of acetaldehyde are to be expected in the melt."

U.S. Pat. No. 4,362,852 describes devolatilizing molten polyamide or polyester polymers with a rotary disk processor. The disk pack is located very close to the spin block in order to minimize polymer degradation during spinning of fibers.

U.S. Pat. No. 4,836,767 describes a method to reduce acetaldehyde during molding. It states that acetaldehyde increases linearly with time and exponentially with temperature.

Japan Patent Application 55-069618 (1980) states that PET with an acetaldehyde content less than 20 ppm is obtained by melt polymerization followed by extrusion into fiber or film and subsequently passing the fiber or film through a fluid or vacuum. Fluids used included air, nitrogen, water and steam.

U.S. Pat. Nos. 5,119,570 and 5,090,134 mention the necessity of solid stating PET polymers in order to obtain low acetaldehyde concentrations.

U.S. Pat. No. 4,963,644 describes the various reasons for solid stating of PET polymers.

U.S. Pat. No. 4,591,629 states that melt phase produced PET has an unacceptably high level of acetaldehyde and uses solid stating in the presence of water to produce low levels of acetaldehyde.

U.S. Pat. No. 4,230,819 describes the removal of acetaldehyde from crystalline PET with a dry gas (air or nitrogen at 170°–250° C.). It states that acetaldehyde cannot be completely removed from PET by heating it under reduced pressure.

It has also been disclosed in the art that additives may be used for reducing the acetaldehyde levels in PET.

U.S. Pat. No. 5,102,594 describes supplying a thermoplastic condensation polymer such as PET in powder form to a vented extruder in which the polymer is devolatilized and then melted.

U.S. Pat. No. 4,980,105 describes the devolatilization of polycarbonates in an extruder to remove volatiles (especially cyclic dimer) and then the melt is forced through a die.

U.S. Pat. No. 4,255,295 describes a process for reclaiming waste polymer.

U.S. Pat. No. 3,486,864 describes a polymerization reactor in which a solid prepolymer is first melted and then a vacuum is used to remove volatile glycol products as fast as possible. Alternatively, it is suggested that a gas be mixed with the prepolymer prior to heating and melting to entrain the liberated glycol during polycondensation.

U.S. Pat. No. 3,913,796 describes a vent-type injection molding machine in which gases such as moisture, air, and other volatiles can be effectively removed. An extrusion screw is used for heating the solid resin to a semi-molten state prior to the injection molding machine.

U.S. Pat. No. 4,060,226 describes a vented injection molding screw extruder, with means to vent gases and vapors from the screw barrel, to produce devolatilized plasticized materials such as nylon and other degradable materials. Oxygen is excluded by means of a check valve.

U.S. Pat. No. 4,142,040 discloses a method of processing in the molten state a saturated polyester resin so as to minimize degradation to yield acetaldehyde. This patent discloses in column 4, lines 38 et seq., "inert gas is introduced through one or more conduits 3 into the bottom of the hopper or through one or more conduits 3a into the feeding zone (or both). The inert gas flushes essentially all air from the polyester as it advances through the initial part of the feeding zone."

DESCRIPTION OF THE INVENTION

Figure 1:
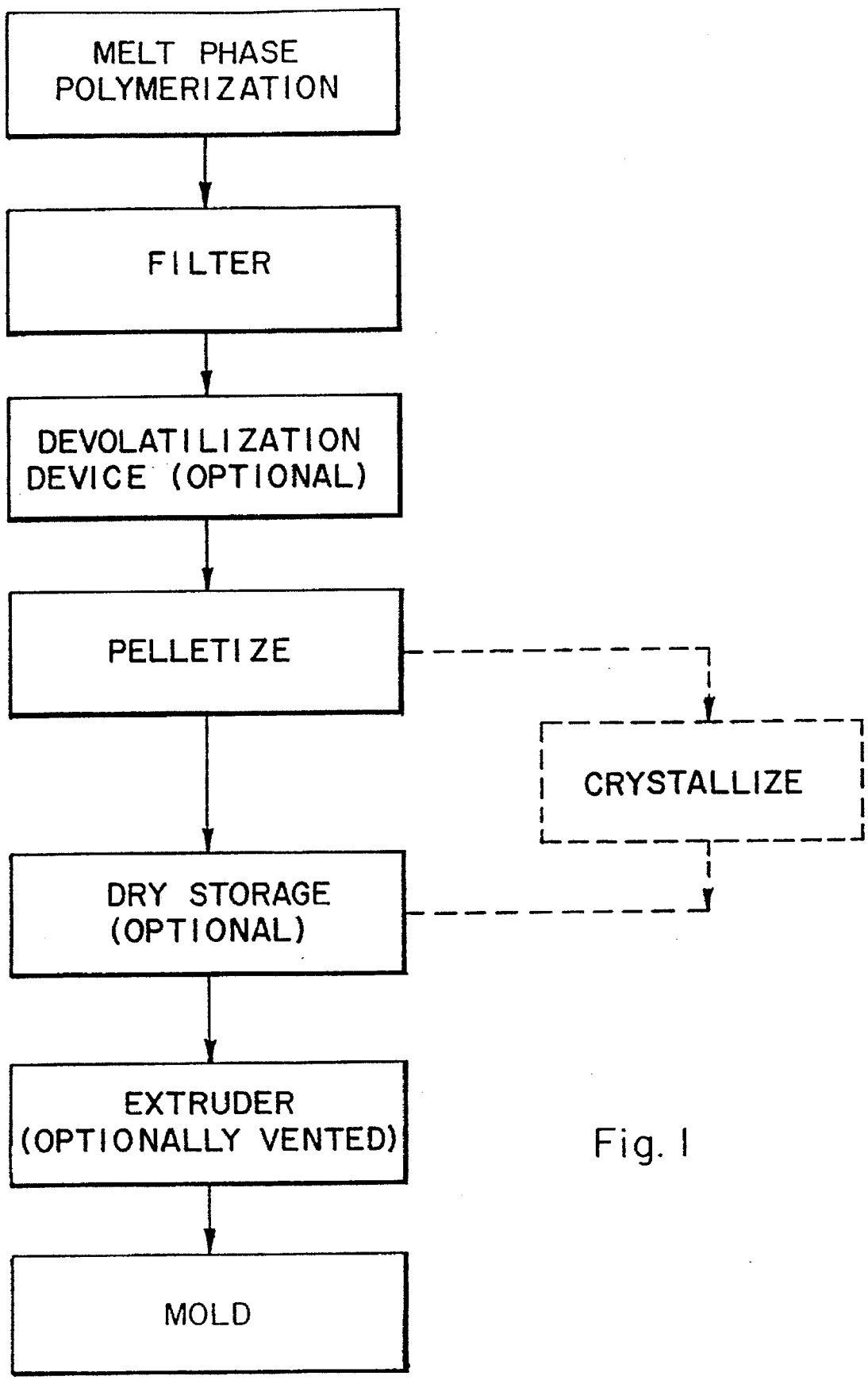
FIG. 1 is a flow diagram illustrating the process of the present invention.

In accordance with the present invention, there is provided a process for producing molded polyester articles having a low acetaldehyde content comprising the steps of a) reacting a glycol and a dicarboxylic acid in the melt phase to form a polyester having an I.V. of about 0.65–0.85, the glycol being selected from the class consisting of glycols having 2–10 carbon atoms and the dicarboxylic acid being selected from alkyl dicarboxylic acids having 2–16 carbon atoms and aryl dicarboxylic acids having 8–16 carbon atoms, b) solidifying and pelletizing the polyester, c) remelting the polyester, and d) forming the polyester into shaped articles, wherein the molten polyester is devolatilized during or following polymerization in the melt, during remelting, after remelting, or any combinations thereof by passing a purge gas over said molten polyester.

The polyester pellets may be crystallized by conventional means known to those skilled in the art (e.g., as disclosed in U.S. Pat. No. 4,064,112) to improve handling if desired, but in a manner so as not to increase molecular weight.

Polymers that are particularly useful in this process include poly(ethylene terephthalate), poly(ethylene naphthalenedicarboxylate), and copolyesters containing up to about 50 mol % of modifying dibasic acids and/or glycols. Modifying dibasic acids may contain from about 2 to about 40 carbon atoms and include isophthalic, adipic, glutaric, azelaic, sebacic, fumaric, dimer, cis- or trans-1,4-cyclohexanedicarboxylic, the various isomers of naphthalenedicarboxylic acids and the like.

Highly useful naphthalenedicarboxylic acids include the 2,6-, 1,4-, 1,5-, or 2,7-isomers but the 1,2-, 1,3-, 1,6-, 1,7-, 1,8-, 2,3-, 2,4-, 2,5-, and/or 2,8-isomers may also be used. The dibasic acids may be used in acid form or as their esters such as the dimethyl esters for example.

Typical modifying glycols may contain from about 3 to about 10 carbon atoms and include propylene glycol, 1,3-propanediol, 1,4-butanediol, 1,6-hexanediol, diethylene glycol, 1,4-cyclohexanediol, 1,4-cyclohexanedimethanol, and the like. The 1,4-cyclohexanedimethanol may be in the cis or the trans form or as cis/trans mixtures.

The polyesters of this invention are readily prepared using polycondensation reaction conditions well known in the art. Typical polyesterification catalysts which may be used include titanium alkoxides, dibutyl tin dilaurate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present. Although we prefer to use continuous polycondensation reactors, batch reactors operated in series may also be used.

Although we prefer to use the polyesters in this process in an unmodified form, other components such as nucleating agents, branching agents, colorants, pigments, fillers, antioxidants, ultraviolet light and heat stabilizers, impact modifiers and the like may be used if desired.

Following preparation of the polyester in the melt phase to an I.V. of 0.65–0.85 as described above, the polyester melt may be passed through a suitable filter to remove impurities, gels, etc. Filtering of polymer is accomplished by well known means.

Suitable purge agents are well known in the art and may be for example, an inert gas, reactive scavenger, etc. Nitrogen is preferred.

Next, the polyester preferably is transferred to a devolatilization device. The devolatilization device can be any apparatus known in the art for generating a large amount of surface area per unit volume and/or for rapidly regenerating the exposed liquid surface. The devolatilization device should subject the liquid surface to a low partial pressure of acetaldehyde and volatile glycols either by using a purge agent or applied vacuum. The devolatilization apparatus may be a vented single-screw or twin-screw extruders (U.S. Pat. No. 4,107,787), a vented twin-screw extruder (U.S. Pat. No. 3,619,145), a rotating disk processor (DiscPac, cf. U.S. Pat. No. 4,362,852), or device which generates thin films of polymer (cf. U.S. Pat. Nos. 3,044,993, 3,161,710, and 3,678, 983), and reactors having agitators with wire screens (U.S. Pat. No. 3,526,484), or having agitators made of foraminous cages (U.S. Pat. No. 3,279,895).

In the case of a high performance final polymerization reactor, a combination of equipment design, production rates, and operating conditions can facilitate increasing the molecular weight of the polyester and devolatilizing acetaldehyde in the same piece of equipment. In this advantageous embodiment, the polymer is rapidly pelletized via a gear pump linked directly to the exit of the reactor. In this embodiment, particular care must be taken to minimize the hold-up of polymer at the reactor exit and in the distribution lines going to extrusion heads. Suitable melt processing temperatures for poly(ethylene terephthalate) polymers will generally be in the range of about 260° to 310° C. Of course, processing temperatures may be adjusted for other types of polyesters depending on the melting point, I.V. value and the like.

Following the devolatilization device, the molten polyester is solidified and pelletized by apparatus well known in the art. The pelletized polyester may be crystallized if desired, to lower the risk of sticking during subsequent handling. If crystallization is used, the apparatus and procedure described in U.S. Pat. No. 4,064,112 may be used.

The pelletized polyester, whether amorphous or crystallized (as shown in broken lines in the diagram of FIG. 1), is normally stored prior to remelting for subsequent molding into useful articles. Storage may be in a dry, controlled atmosphere so the pellets will not pick up moisture. As described herein, moisture contributes to formation of undesirable by-products. However, if the storage is not dry, the subsequent remelting will be done in such a way to provide a means to dry the material while melting.

Figure 2:
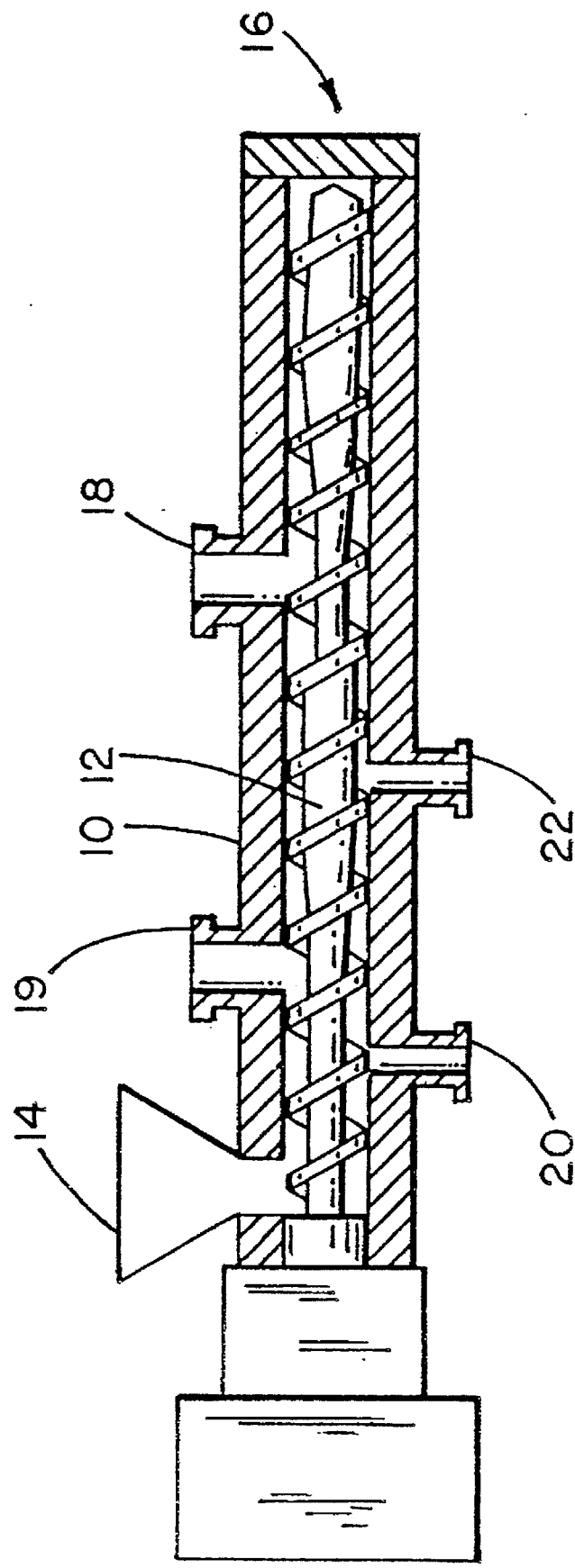
FIG. 2 is a schematic diagram illustrating a vented extruder which may be used in the process of the present invention.

Polyester pellets from storage are remelted by feeding them to an extruder, preferably vented, as illustrated in FIG. 2. In this device the polyester's I.V. is raised to about 0.75–0.80 in the melt phase. Also, the volatile impurities such as acetaldehyde are reduced. The extruder may include a purge agent and/or vacuum vent for removal of volatiles such as acetaldehyde. Either a single or twin screw extruder may be used. The single screw illustrated in FIG. 2 includes barrel 10, having screw 12 contained therein for rotation, thereby feeding polymer pellets from feed hopper 14 down the length of the barrel where they are melted, degassed and finally extruded from the end at 16. Vent 19 removes moisture as the pellets are heated and melted. Normally, the pressure at vents 18 and 19 can range from about 0.0001 to about 3 atmospheres. Preferably, a purge agent can be used at either vents 18 or 19 to assist in the removal of volatiles. If used, the purge agent may enter the barrel through fittings feeding in through openings 18 and 19 (not shown), using conventional means well known in the art. Also, optional vents 20 and 22 may be used. Suitable melt processing temperatures for poly(ethylene terephthalate) polymers will generally be in the range of about 260° to 310° C. Of course, processing temperatures may be adjusted for other types of polyesters depending on the melting point, I.V. value and the like. The devolatilized polyester from this extruder is conveyed to a mold where it is formed into a useful article such as a bottle preform.

The term "I.V." used herein refers to the Inherent viscosity of the polymer, as determined by standard methods on a solution of 0.5 g of polymer dissolved in 100 mL of a mixture of phenol (60% by volume) and tetrachloroethane (40% by volume).

The residual acetaldehyde content of the molten polymer is measured as follows:

Extruded polyester samples are collected into dry ice to quench the melt. The polymer is then immediately chopped into granules and approximately 6 g is placed into vials with rubber lined caps. Vials are stored at −40° C. for no longer than three days before analysis. The samples are then ground in a Wiley mill to pass a 20 mesh screen and placed in gas chromatography desorption tubes. The acetaldehyde is desorbed from the polymer at 150° C. for 10 minutes and quantified by gas chromatography.

EXAMPLES

The following examples will further illustrate the invention: However it will be understood that they are provided merely for illustrative purposes, and are not intended to limit the scope of the invention in any way. Examples 1–10 utilize a crystallization step. Examples 11–20 omit a crystallization step.

Example 1

Filtered poly(ethylene terephthalate) (PET) modified with 3.5 mol % 1,4-cyclohexanedimethanol (a 30/70 mol % cis,trans- mixture) and with an I.V.=0.64 is fed to a vented twin-screw reactor. After a residence time of 25 min at a temperature of 275° C. and a pressure of 9.75 torr, the polymer has an I.V.=0.75 and residual acetaldehyde of 5 ppm. The polymer is then pelletized through a pump and die system with less than 30 seconds average residence time. The amorphous pellets are crystallized in a Bepex crystallization unit at 120° C. for 30 minutes. It is kept in dry storage prior to being remelted and molded in a molding machine where the melted polymer has a residence time above 260° C. of less than 90 seconds. The amount of residual acetaldehyde in the molded preforms in 9 ppm and the I.V. of the polymer in the preform is 0.73.

Example 2

The crystallized pellets of Example 1 are kept in storage in contact with ambient moisture. It is remelted in an extruder in which the melting zone is swept by a counter current flow of dry nitrogen and molded in a molding machine where the melted polymer has a residence time above 260° C. of less than 90 seconds. The amount of residual acetaldehyde in the molded preforms is 9 ppm and the I.V. of the polymer is 0.73.

Example 3

PET is prepared to an I.V.=0.74 with a final melt temperature of 285° C., filtered, pelletized, and crystallized. The pellets are distributed to a plurality of devotalilizing vented extruders. Each stream has a flow rate equal to the capacity of one multi-cavity molding machine. The polymer entering the devolatilizing extruders contains 3000 ppm of water and 210 ppm residual acetaldehyde. The devolatilizers are purged with nitrogen. While in the devolatilizer for a mean residence time of 15 min, the polymer is processed at 270° C. The polymer exiting the devolatilizer has 2 ppm residual acetaldehyde, and is ejected directly to a multi-cavity molding machine. The preforms produced have an I.V.=0.77 and acetaldehyde=5 ppm.

Example 4

This example uses the same equipment configuration as Example 3. PET is prepared to an I.V.=0.67 at 270° C. in the melt-phase reactors, and it contains 60 ppm residual acetaldehyde after pelletization and crystallization for distribution to the devolatilizing extruders. After 10 min residence time in each devolatilizer under nitrogen purge, the polymer is molded into preforms with an I.V.=0.70 and a residual acetaldehyde level of 3.5 ppm.

Example 5

This example uses the same equipment configuration as Example 3. PET is prepared to an I.V.=0.75 at 270° C. in the melt-phase reactors, and it contains 80 ppm residual acetaldehyde after filtration, pelletization, and crystallization. It is transported to and remelted in devolatilizing extruders. After 5 min residence time in each devolatilizer under nitrogen purge, and approximately 2 min traveling to the molds before being cooled, the polymer has an I.V.=0.75 and a residual acetaldehyde content of 10 ppm. The acetaldehyde regeneration rate during the transport of the polymer out of the devolatilizer and through the molding machine to the molds is measured to be 1 ppm per minute.

Example 6

PET is prepared to an I.V.=0.71 at a temperature of 275° C., and is filtered, pelletized, and crystallized prior to transport to a devolatilizer\reactor operating at 275° C. and at 0.75 torr pressure. After a residence time of 10 minutes at 275° C. where residual acetaldehyde is reduced to 6 ppm, a gear pump is used to pump the polymer through a distribution system to a plurality of multi-cavity molding machines. The resulting preforms have an I.V.=0.75 and a residual acetaldehyde level of 10 ppm.

Example 7

PET is prepared to an I.V.=0.5 at 275° C., and pumped through filters to another polycondensation reactor operating at 275° C. and 0.75 torr. This reactor generates a large amount of surface area and the polymer achieves an I.V.=0.75 in 30 min. The molten polymer with 20 ppm acetaldehyde is pelletized, crystallized, and stored under dry storage conditions. The dry pellets are remelted and then pumped through a multi-hole die to generate thin molten threads which fall through an open vessel purged with nitrogen gas. The molten polymer is then collected at the bottom of the vessel and distributed to a plurality of molding machines. The resulting preforms have an I.V.=0.75 and a residual acetaldehyde level of 10 ppm.

Example 8

PET is prepared to an I.V.=0.5 at 275° C., and pumped through filters to another polycondensation reactor operating at 275° C. and 0.75 torr. This reactor generates a large amount of surface area and the polymer achieves an I.V.=0.75 in 30 min. The molten polymer with 20 ppm acetaldehyde is pelletized, crystallized, and stored. The pellets containing up to 5000 ppm moisture are remelted in a machine with a purged melting section and one vacuum devolatilization section with a 3 second average residence time and then pumped through a multi-hole die to generate thin molten threads which fall through an open vessel purged with gas. The molten polymer is then collected at the bottom of the vessel and distributed to a plurality of molding machines. The resulting preforms have an I.V.=0.73 and a residual acetaldehyde content of 10 ppm.

Example 9

PET is prepared to an I.V.=0.64 by conventional technology with a final melt temperature of 285° C. After being pumped though a filter and then pelletized and crystallized, the polymer contains 100 ppm residual acetaldehyde. The pellets containing acetaldehyde and moisture from ambient air contact are fed to a plurality of drying extruders feeding devolatilizing reactors. These reactor\devolatilizers operate at 0.75 torr pressure and process the polymer to 275° C. After a residence time of 20 min, the polymer from each devolatilizer is pumped via a gear pump to a plurality of multi-cavity molding machines. An accumulation cavity for each molding machine is filled sequentially via an appropriate switching valve and distribution lines. In this manner steady flow from the devolatilizer\extruder is maintained. The resulting preforms have an I.V.=0.75 and a residual acetaldehyde content of 9 ppm.

Example 10

PET is prepared to an I.V.=0.64 by conventional technology with a final melt temperature of 285° C. After being pumped though a filter, pelletized, crystallized, and dried, the polymer contains 100 ppm residual acetaldehyde. The pellets are kept in dry storage. The pellets containing acetaldehyde are fed to a plurality of extruders feeding devolatilizing reactors. These reactor\devolatilizers operate at 0.75 torr pressure and process the polymer to 275° C. After a residence time of 20 min, the polymer from each devolatilizer is pumped via a gear pump to a plurality of multi-cavity molding machines. An accumulation cavity for each molding machine is filled sequentially via an appropriate switching valve and distribution lines. In this manner steady flow from the devolatilizer\extruder is maintained. The resulting preforms have an I.V.=0.75 and a residual acetaldehyde content of 9 ppm.

Example 11

Filtered poly(ethylene terephthalate) (PET) modified with 3.5 mol % 1,4-cyclohexanedimethanol (a 30/70 mol % cis, trans-mixture) and with an I.V.=0.64 is fed to a vented twin-screw reactor. After a residence time of 25 min at a temperature of 275° C. and a pressure of 0.75 torr, the polymer has an I.V.=0.75 and residual acetaldehyde of 5 ppm. The polymer is then pelletized through a pump and die system with less than 30 seconds average residence time. It is kept in dry storage prior to being remelted and molded in a molding machine where the melted polymer has a residence time above 200° C. of less than 90 seconds. The amount of residual acetaldehyde in the molded preforms is 9 ppm and the I.V. of the polymer in the preform is 0.73.

Example 12

The pellets of Example 1 are kept in storage in contact with ambient moisture. It is remelted in an extruder in which the melting zone is swept by a counter current flow of dry nitrogen and molded in a molding machine where the melted polymer has a residence time above 200° C. of less than 90 seconds. The amount of residual acetaldehyde in the molded preforms is 9 ppm and the I.V. of the polymer is 0.73.

Example 13

PET is prepared to an I.V.=0.74 with a final melt temperature of 285° C., filtered, and pelletized. The pellets are distributed to a plurality of devolatilizing vented extruders. Each stream has a flow rate equal to the capacity of one multi-cavity molding machine. The polymer entering the devolatilizing extruders contains 3000 ppm of water and 210 ppm residual acetaldehyde. The devolatilizers are purged with nitrogen. While in the devolatilizer for a mean residence time of 15 min, the polymer is processed at 270° C. The polymer exiting the devolatilizer has 2 ppm residual acetaldehyde, and is ejected directly to a multi-cavity molding machine. The preforms produced have an I.V.=0.77 and acetaldehyde=5 ppm.

Example 14

This example uses the same equipment configuration as Example 3. PET is prepared to an I.V.=0.67 at 270° C. in the melt-phase reactors, and it contains 60 ppm residual acetaldehyde after pelletization for distribution to the devolatilizing extruders. After 10 min residence time in each devolatilizer under nitrogen purge, the polymer is molded into preforms with an I.V.=0.70 and a residual acetaldehyde level of 3.5 ppm.

Example 15

This example uses the same equipment configuration as Example 3. PET is prepared to an I.V.=0.75 at 270° C. in the melt-phase reactors, and it contains 80 ppm residual acetaldehyde after filtration and pelletization. It is transported to and remelted in devolatilizing extruders. After 5 min residence time in each devolatilizer under nitrogen purge, and approximately 2 min traveling to the molds before being cooled, the polymer has an I.V.=0.75 and a residual acetaldehyde content of 10 ppm. The acetaldehyde regeneration rate during the transport of the polymer out of the devolatilizer and through the molding machine to the molds is measured to be 1 ppm per minute.

Example 16

PET is prepared to an I.V.=0.71 at a temperature of 275° C., and is filtered and pelletized prior to transport to a devolatilizer\reactor operating at 275° C. and at 0.75 torr pressure. After a residence time of 10 minutes at 275° C. where residual acetaldehyde is reduced to 6 ppm, a gear pump is used to pump the polymer through a distribution system to a plurality of multi-cavity molding machines. The resulting preforms have an I.V.=0.75 and a residual acetaldehyde level of 10 ppm.

Example 17

PET is prepared to an I.V.=0.5 at 275° C., and pumped through filters to another polycondensation reactor operating at 275° C. and 0.75 torr. This reactor generates a large amount of surface area and the polymer achieves an I.V.= 0.75 in 30 min. The molten polymer with 20 ppm acetaldehyde is pelletized and stored under dry storage conditions. The dry pellets are remelted and then pumped through a multi-hole die to generate thin molten threads which fall through an open vessel purged with nitrogen gas. The molten polymer is then collected at the bottom of the vessel and distributed to a plurality of molding machines. The resulting preforms have an I.V.=0.75 and a residual acetaldehyde level of 10 ppm.

Example 18

PET is prepared to an I.V.=0.5 at 275° C., and pumped through filters to another polycondensation reactor operating at 275° C. and 0.75 torr. This reactor generates a large amount of surface area and the polymer achieves an I.V.= 0.75 in 30 min. The molten polymer with 20 ppm acetaldehyde is pelletized and stored. The pellets containing up to 5000 ppm moisture are remelted in a machine with a purged melting section and one vacuum devolatilization section with a 3 second average residence time and then pumped through a multi-hole die to generate thin molten threads which fall through an open vessel purged with gas. The molten polymer is then collected at the bottom of the vessel and distributed to a plurality of molding machines. The resulting preforms have an I.V.=0.73 and a residual acetaldehyde content of 10 ppm.

Example 19

PET is prepared to an I.V.=0.64 by conventional technology with a final melt temperature of 285° C. After being pumped though a filter and pelletized, the polymer contains 100 ppm residual acetaldehyde. The pellets containing acetaldehyde and moisture from ambient air contact are fed to a plurality of drying extruders feeding devolatilizing reactors. These reactor\devolatilizers operate at 0.75 torr pressure and process the polymer to 275° C. After a residence time of 20 min, the polymer from each devolatilizer is pumped via a gear pump to a plurality of multi-cavity molding machines. An accumulation cavity for each molding machine is filled sequentially via an appropriate switching valve and distribution lines. In this manner steady flow from the devolatilizer\extruder is maintained. The resulting preforms have an I.V.=0.75 and a residual acetaldehyde content of 9 ppm.

Example 20

PET is prepared to an I.V.=0.64 by conventional technology with a final melt temperature of 285° C. After being pumped though a filter, pelletized, and dewatered, the polymer contains 100 ppm residual acetaldehyde. The pellets are kept in dry storage. The pellets containing acetaldehyde are fed to a plurality of extruders feeding devolatilizing reactors. These reactor\devolatilizers operate at 0.75 torr pressure and process the polymer to 275° C. After a residence time of 20 min, the polymer from each devolatilizer is pumped via a gear pump to a plurality of multi-cavity molding machines. An accumulation cavity for each molding machine is filled sequentially via an appropriate switching valve and distribution lines. In this manner steady flow from the devolatilizer\extruder is maintained. The resulting preforms have an I.V.=0.75 and a residual acetaldehyde content of 9 ppm.

Unless otherwise specified, all parts, percentages, etc., are by weight.

The invention has been described in detail with particular reference to preferred embodiments thereof, but it will be understood that variations and modifications can be effected within the spirit and scope of the invention.

We claim:

1. A process for producing molded polyester articles having an acetaldehyde content of less than about 10 ppm comprising the steps of a) reacting a glycol and a dicarboxylic acid in the melt phase to form a polyester having in I.V. of about 0.65–0.85, said glycol being selected from the class consisting of glycols having 2–10 carbon atoms and said dicarboxylic acid being selected from alkyl dicarboxylic acids having 2–16 carbon atoms and aryl dicarboxylic acids having 8–16 carbon atoms, b) solidifying and pelletizing said polyester, c) remelting said polyester to form molten polyester, and d) forming said molten polyester into shaped articles, wherein, during step a), step b), step c), step d), or a combination thereof, the polyester is devolatilized by passing a purge agent over said polyester, wherein no solid state polymerization step is performed and wherein no drying step is performed.

2. Process according to claim 1 wherein the polyester from step a) has an I.V. of about 0.70–0.80.

3. Process according to claim 1 wherein said polyester is devolatilized in an extruder.

4. A process according to claim 1 wherein said polyester is crystallized prior to step c).

5. Process according to claim 1 wherein the polyester has a final residual acetaldehyde content of less than 5 ppm.

6. Process according to claim 1 wherein at least 80 mol % of said dicarboxylic acid is terephthalic acid.

7. Process according to claim 1 wherein at least 80 mol % of said dicarboxylic acid is naphthalene dicarboxylic acid.

8. Process according to claim 1 wherein at least 80 mol % of said glycol is ethylene glycol.

9. Process according to claim 1 wherein said glycol is a mixture of ethylene glycol and cyclohexanedimethanol.

10. Process according to claim 1 wherein said acid is terephthalic acid and said glycol is a mixture of about 60–99 mol % ethylene glycol and about 40–1 mol % cyclohexanedimethanol.

11. Process according to claim 4 wherein the polyester is remelted and devolatilized in an extruder during, following, or during and following remelting.

* * * * *